(12) United States Patent
Gold

(10) Patent No.: US 7,296,581 B2
(45) Date of Patent: Nov. 20, 2007

(54) HAIR EXTENSION APPLICATOR

(75) Inventor: David Anthony Gold, Nepi (IT)

(73) Assignee: Indorata - Servicos e Gestão Lda (PT)

( * ) Notice: Subject to any disclaimer, the term of this patent is extended or adjusted under 35 U.S.C. 154(b) by 391 days.

(21) Appl. No.: 10/502,508

(22) PCT Filed: Jan. 23, 2003

(86) PCT No.: PCT/IB03/00165

§ 371 (c)(1),
(2), (4) Date: Jul. 23, 2004

(87) PCT Pub. No.: WO03/061416

PCT Pub. Date: Jul. 31, 2003

(65) Prior Publication Data

US 2005/0155620 A1 Jul. 21, 2005

(30) Foreign Application Priority Data

Jan. 23, 2002 (IT) ............................ RM2002A0033
Sep. 16, 2002 (IT) ............................ RM2002A0461

(51) Int. Cl.
*A45D 7/02* (2006.01)

(52) U.S. Cl. ................... 132/212; 132/201; 132/224
(58) Field of Classification Search ............... 132/216, 132/217, 224, 225, 201, 212, 333; 223/51, 223/52.3, 57, 52.5, 52.6
See application file for complete search history.

(56) References Cited

U.S. PATENT DOCUMENTS

| 3,642,010 A | * | 2/1972 | Kuris ......................... 132/201 |
| 5,474,633 A | * | 12/1995 | Myers ........................ 156/230 |
| 6,510,856 B1 | * | 1/2003 | Ahn ............................ 132/219 |
| 6,668,758 B1 | * | 12/2003 | Davis, Jr. .................... 119/608 |

* cited by examiner

*Primary Examiner*—Todd E. Manahan
(74) *Attorney, Agent, or Firm*—Leffert Jay & Polglaze, P.A.

(57) ABSTRACT

A hair extension applicator (1), of the kind used to lengthen and/or thicken head hairs by applying additional hair extensions to natural hair, enables a strong precision and rapidity in use and comprises a handle (2), a pair of jaws (6,7) adjacent therebetween, supported on said handle (2), apt to receive therebetween a portion of head hair and one or more fixing elements of respective additional hair extensions, pressing member and respective actuation means (11) which determine the programmed translation of the pressing member (9) with respect to a contrast means.

19 Claims, 6 Drawing Sheets

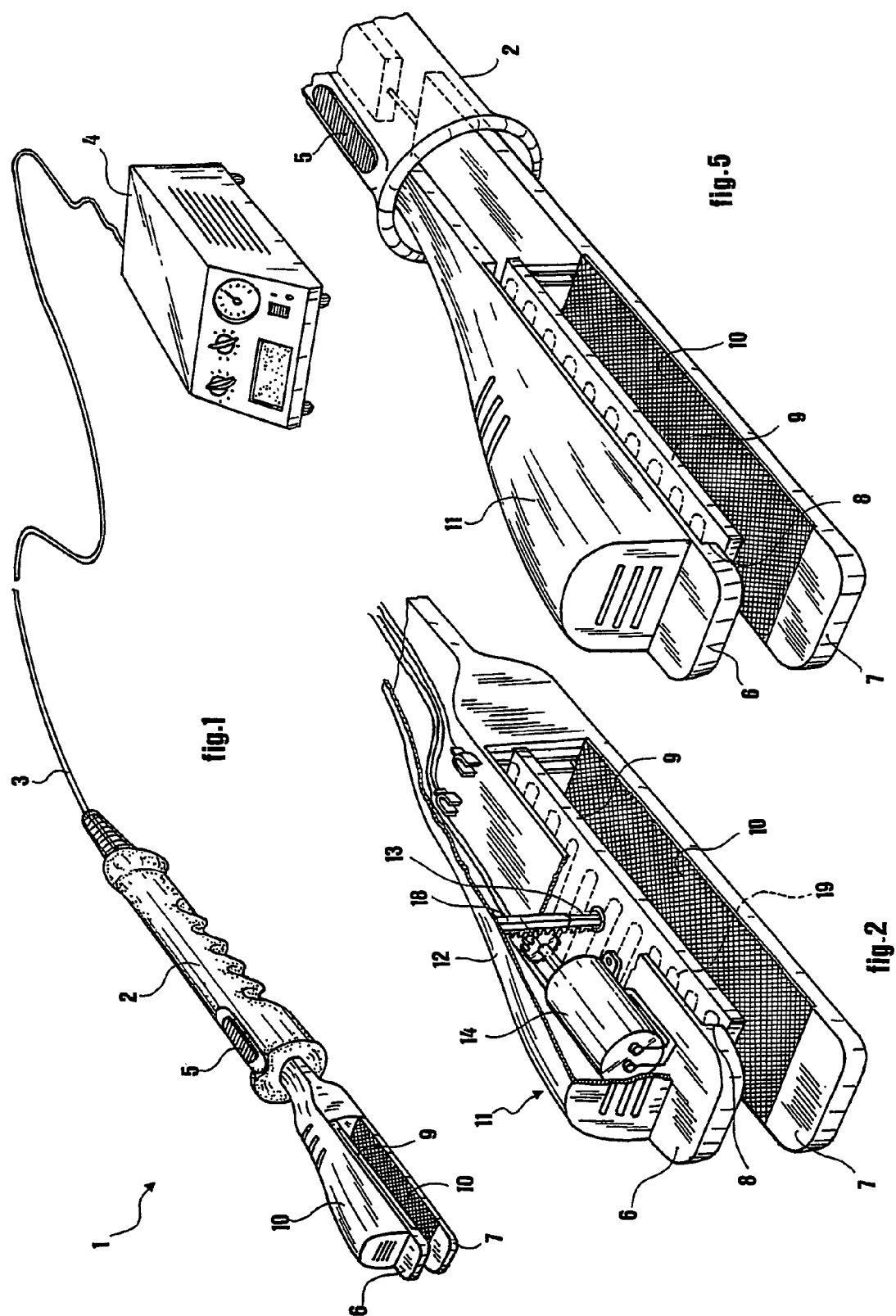

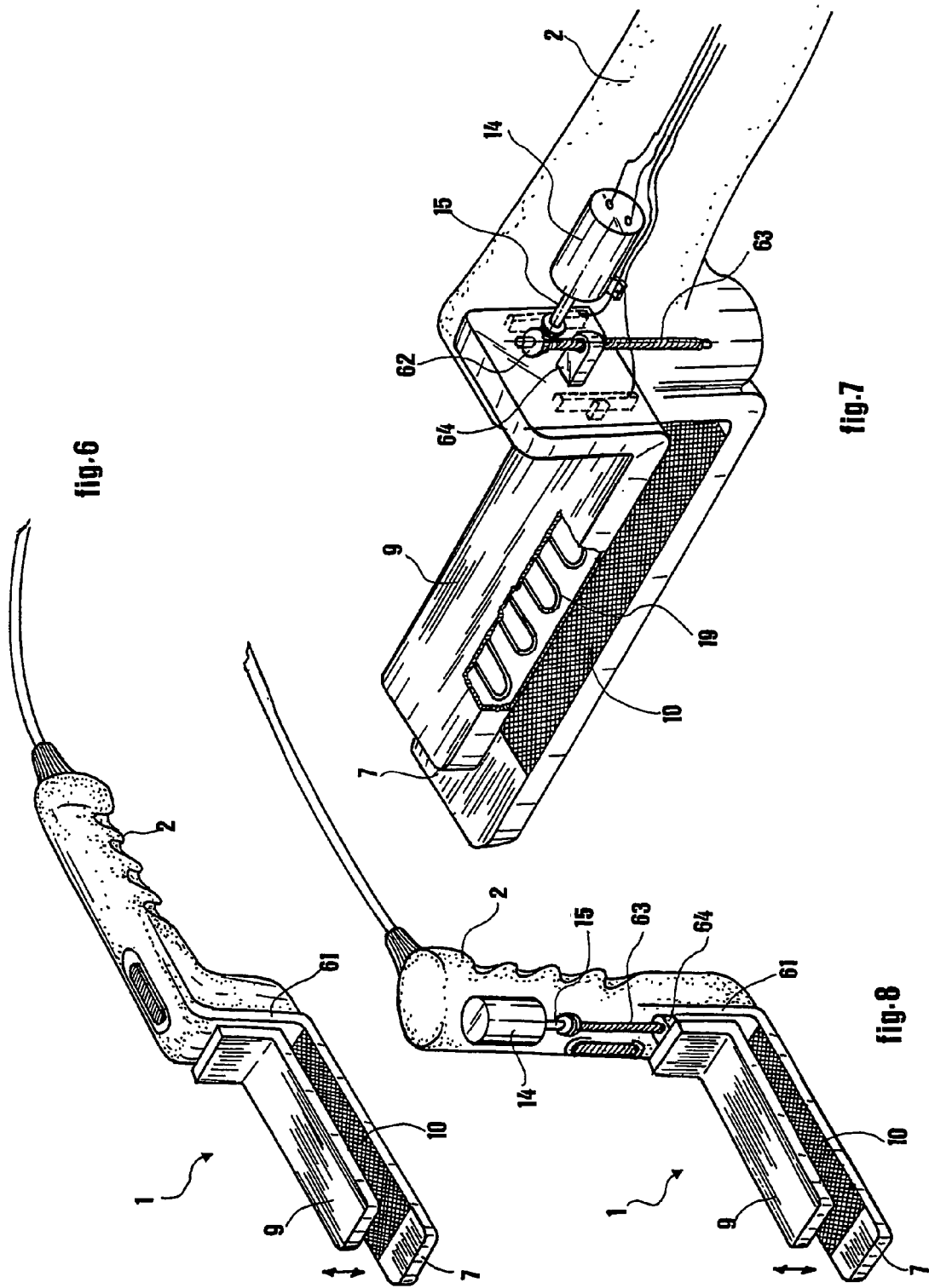

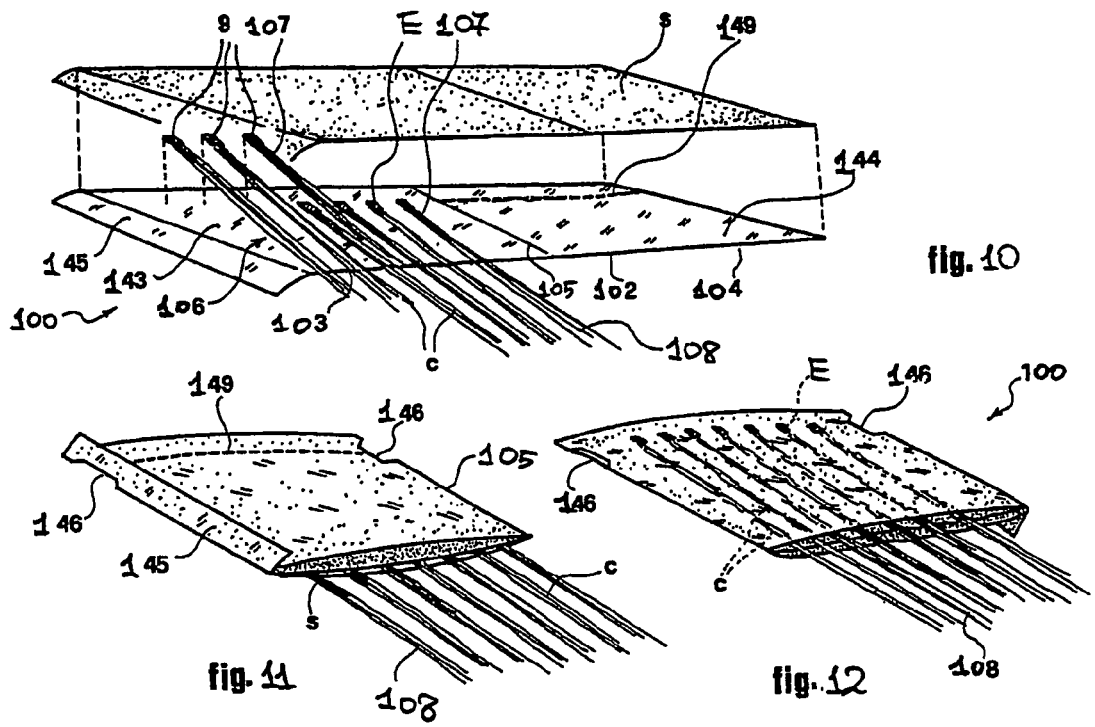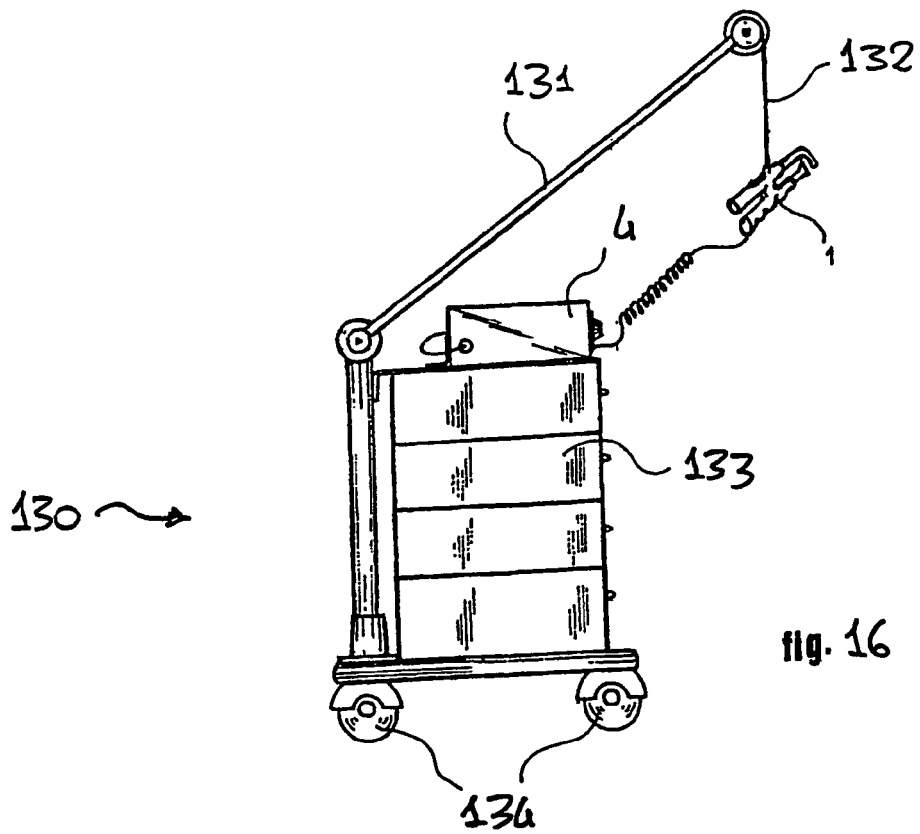

HAIR EXTENSION APPLICATOR

BACKGROUND OF THE INVENTION

1. Field of the Invention

The object of the present invention is a hair extension applicator, of the kind used to lengthen and/or thicken head hairs by applying additional hair extensions, usually called hair extensions, to natural hair.

2. Description of the Prior Art

In the art several kinds of additional hair extensions are known. Generally, they provide a quantity of joined additional hair, at a common proximal end, of a fixing element the nature thereof could be extremely variable.

In fact, fixing elements were described comprising adhesives sensible to pressure and/or heat, thermoplastic material, termomelting or termosetting materials and so on. Generally, the most widespread application techniques provide that a pressure be applied on the fixing element, in case together with heat or also ultrasound, for example, in order to activate adhesion of the fixing element. The pressure application is often followed by a handling of the fixing element with the purpose of verifying the adhesion success and the connection sizes inside the head hair, before the connection itself solidifies and it could not be modified.

To carry out these application techniques a wide use of pliers is made which, with proper changes, can apply pressure and heat, or pressure and ultrasounds, and so on, at the same time. The use of more and more perfect pliers allowed speeding up and making the application of additional hair extensions and the control of the connection sizes easier.

Examples of this kind of pliers are disclosed in U.S. Pat. No. 3,642,010-A and EP 0 650 672 A1.

In the Italian patent application No. RM2001A000317 of 7 Jun. 2001 in the name of the same Applicant, a set of extensions approached one to the other and applicable in a single solution thanks to the use of an adhesive tape supporting the respective fixing elements is described.

The application occurs by applying pressure on all fixing elements at the same time by means of said adhesive tape which allows, apart from the multiple connections for all the extensions of the set, also a precise control of the sizes of the connections themselves and the use then of a lower quantity of thermoplastic substance which translates into a smaller connection, practically not perceptible to the touch.

In this example, the contemporary application of pressure on all the fixing elements of the extensions occurs by using pliers equipped with elongated pressing members, so as to encompass and squeeze all fixing elements with one single movement.

The pliers used so far in this kind of applications were not wholly satisfactory and they have limited the spread of the additional hair extensions, especially those of the kind arranged in series on an adhesive tape.

In fact, the known pliers, which carry out the applicator function of the above-mentioned extensions, are heavy devices, above all but not exclusively due to the heating means or to generate ultrasounds, difficult to handle with a constant precision along a continuous series of applications, prolonged in time as it may happen in a hairdresser's saloon working on several users.

Such handling difficulties, however, lengthen the application time, require the use of specialized personnel able to judge the connection success and increase then the costs of lengthening and thickening procedures.

Furthermore, in case a series of extensions is applied with a single pliers, the pressure applied on the fixing elements may be not uniform depending upon the shape of the pressing members but also upon the physical strength of the operator. This lack in uniformity may lead to the formation of imperfect connections which limit the quality of the lengthening or thickening.

In particular, it has been noted that the pressure application on the fixing elements of the extensions is not sensible to the thickness variation of extensions and fixing elements, with the consequence that, if the thickness is big, the applied pressure will be excessive and so on.

SUMMARY OF THE INVENTION

The technical problem underlying the present invention is to provide an applicator enabling to obviate to the drawbacks mentioned with reference to the known art.

Such problem is solved by an applicator of the above-mentioned kind, comprising a handle, at least a fixed jaw member and at least a pressing member, the latter apt to receive therebetween a portion of head hair and one or more fixing elements of respective additional hair extensions, and driving means of said at least one pressing member, characterized in that said at least one pressing member is controlled by said driving means in a bidirectional translation motion to apply a predetermined pressure with respect to said at least a fixed jaw member acting as contrast means to the action of said at least one pressing member.

According to the same inventive concept, the present invention relates to an applicator characterizing in that it comprises a handle and a pair of fixed jaws, adjacent one to the other, supported on said handle, apt to receive therebetween a portion of head hair and one or more fixing elements of respective additional hair extensions, a first jaw of said pair by supporting at least a pressing member and driving means of said at least one pressing member, the second jaw acting as contrast means to the action of said at least one pressing member.

In a preferred embodiment of such applicator, the driving means are activated by a start command and operate according to a pre-set programme providing a translation of the pressing member towards the fixed jaw member, a compression of a portion of head hair and one or more fixing elements of respective additional hair extensions, activation of said fixing elements and back motion of the pressing member.

In an additional preferred embodiment said technical problem is solved by an applicator of the kind above described, comprising:

- a fixed contrast member being a rest for fixing elements of extensions on a supporting tape and for the corresponding hair of a head hair to thicken; and
- a mobile pressing member acting on said fixed member, mobile pressing member being controlled by a pneumatic device working at a predetermined pressure.

The main advantage of the applicator according to the present invention lies in enabling an application of extensions with uniform and always equally repeated fixing elements, independently from the number of extensions and without the need for the operator to apply a constant strength or to have a particular experience in the application.

Furthermore, the application times are considerably shortened, by providing then the possibility of implementing complete lengthening and/or thickening in very short time.

Moreover, the pressure applied on the fixing elements does not vary upon the extensions' thickness.

Such applicator is likely to be effectively utilized with extensions in series, with additional hair of any kind, colour or nature. A preferred use of said applicator is provided for the application of hair of different colour, streaks, highlights and the like.

BRIEF DESCRIPTION OF THE DRAWINGS

The present invention will be described herebelow according to some of the preferred embodiments thereof, provided for exemplary and not limitative purpose by referring to the enclosed drawings wherein:

FIG. 1 shows a perspective view of a first example of applicator according to the invention;

FIG. 2 shows a perspective and partial sectional view of a detail of the applicator of FIG. 1;

FIG. 5 shows a perspective and partial sectional view of the detail of FIG. 2 according to an additional alternative variant of execution;

FIG. 6 shows a perspective view of a second embodiment example of an applicator according to the invention;

FIG. 7 shows a perspective and partial sectional view of an enlarged detail of the applicator of FIG. 6;

FIG. 8 shows a perspective and partial sectional view of an additional variant of the applicator of FIG. 6.

FIGS. 10, 11 and 12 show perspective views illustrating an example of a set of extensions applicable with the applicators of the preceding figures;

FIG. 16 shows a elevational view of an apparatus for a hairdresser's saloon including one of the applicators of the preceding figures.

DESCRIPTION OF THE PREFERRED EMBODIMENTS

Figure 3:
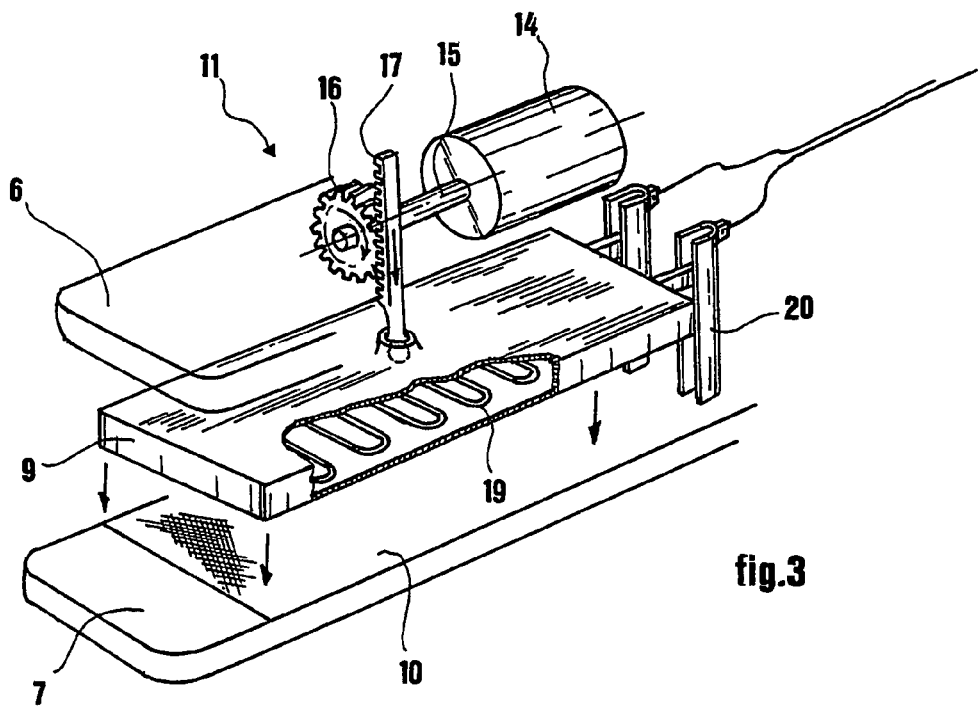
FIG. 3 shows a perspective and partial sectional view of the enlarged detail of FIG. 2.

By referring to the FIG. 1, a hair extension applicator, of the kind used to lengthen and/or thicken head hairs by applying additional hair extensions to natural hair, is designated as a whole with 1. It comprises a handle 2 which is connected, through a cable 3, with a control unit 4 or central system in short, electrically powered and equipped with a programmable processor and a memory unit supporting the operation of the applicator 1, as it will be clear hereinafter.

The handle 2 has an actuation key 5 and supports a pair of jaws, a first jaw 6 and a second jaw 7 in particular, both of them elongated lamina-shaped.

The jaw 6, 7 are fixed, adjacent and parallel therebetween, supported on said handle, apt to receive therebetween a portion of head hair and one or more members of respective additional hair extensions.

The first jaw 6 (FIGS. 2 and 3) comprises, on its inner surface facing the second jaw 7, a recess 8 receiving a pressing member 9, that is substantially a press, apt to apply a pressure upon the opposite surface of the second jaw 7.

In contrast to said pressing member 9, the second jaw 7 has a surface plate 10, preferably made of elastically deformable material, such as rubber, silicone, polytetrafluoroethylene or the like.

In this way, the second jaw 7 acts as fixed jaw member, or fixed member in short, with respect to mobile member which, in the present embodiment example, is constituted by the pressing member and it is able to act as contrast means to the action of said at least a pressing member 9.

The first jaw 6 further supports actuations means of said pressing member 9, designated as a whole with 11, received in a case 12 developing on the outer face of the first jaw 6.

Such actuation means 11 comprises an actuation arm 13 which is pivoted substantially in the centre of the pressing member 9 which then is able to swing with respect to the actuation arm 13, to compensate possible thickness differences of the head hair received between said jaws 6, 7 as it will be clearer hereinafter.

Thanks to said actuation means, the pressing member is controlled in a two-directional translation motion, that is towards and from the second jaw 7, to apply a predetermined pressure with respect to the surface plate on the head hair portion and on the fixing elements placed thereon.

According to the present embodiment example, the actuation means 11 comprises an electric motor 14, of the kind apt to develop great power with respect to its own sizes and to control its own shaft 15 for limited portions of round angle, in both directions.

In such example, the actuation arm 13 is mechanically engaged to the shaft 15 of the motor 14, in particular thanks to a gear wheel 16, controlled by the driving shaft 14 which is implemented in specific teeth 17 formed on one side of the arm 13. To this purpose, the arm 13 is inserted in a specific slideway 18 limiting the stroke thereof.

The electric motor 14 is electrically powered through the cable 3 and the unit 4 inside thereof the motor actuation time, that is the time interval elapsing between the down stroke of the pressing member 9, controlled by the push button 5, and the upstroke thereof, is stored.

In the unit 4 the squeezing power of the pressing member 9, that is the power supply of the motor 14, will be stored too.

In the applicator member 1, the pressing member 9 implements actuation means of the extensions' fixing elements, due to the pressure applied on the fixing elements themselves. Furthermore, the pressing member is electrically heated by means of serpentine-arranged thermistors 19 embedded in the thickness of the pressing member 9 and properly electrically powered through the cable 3 of the applicator.

Similarly to what said for the operation of the electric motor 14, the time period length wherein the thermistors 19 are actuated and the electrical power of the power supply are stored in the unit 4.

Obviously, the electrical power supply of the thermistors 19 has not to affect the down stroke and upstroke of the pressing member 9, therefore it can occur for example by means of sliding contacts 20.

Figure 4:
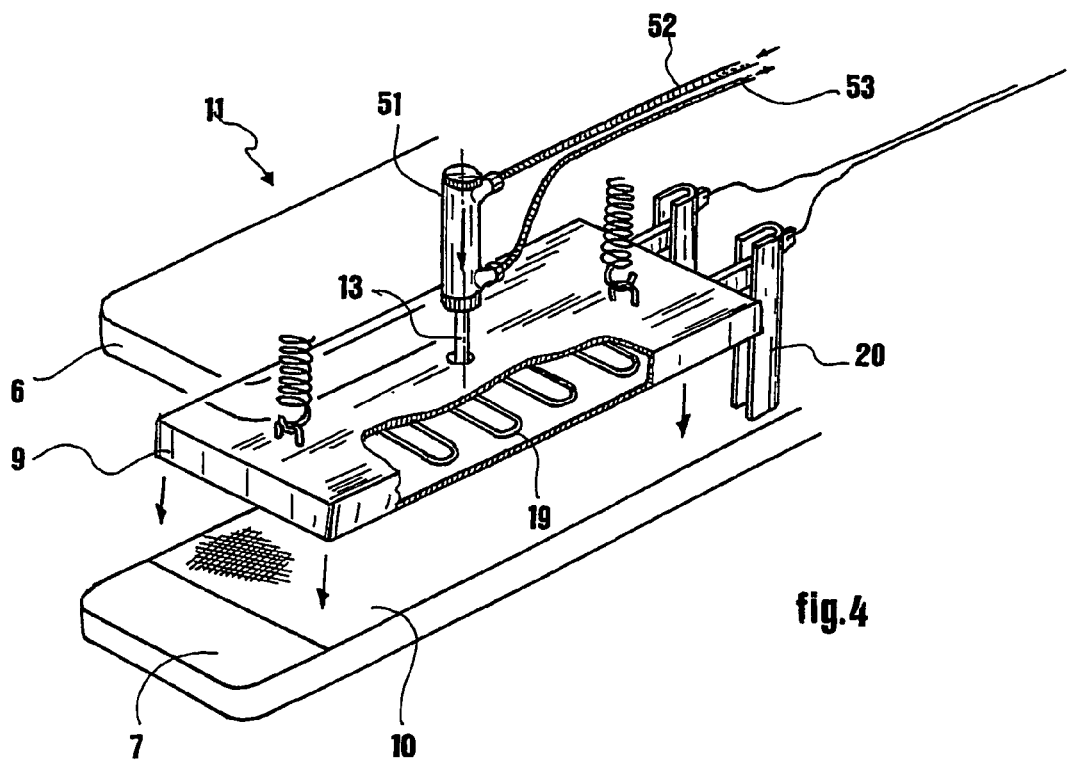
FIG. 4 shows a perspective and partial sectional view of the enlarged detail of FIG. 3 according to a first alternative variant of execution.

By referring to FIG. 4 a first variant of said embodiment example of the applicator 1 will be described 1, for which the same reference numerals designate equal or equivalent components.

In such embodiment example the actuation means 11 actuating the pressing member are of hydraulic kind and comprises an actuator cylinder 51 the stem thereof constitutes said actuation arm 13.

The actuator cylinder 51, manufactured with reduced sizes, could be placed vertically (FIG. 4) or horizontally too and in such case the stem and the actuation arm will be mechanically connected, for example by a gear wheel system.

Said actuator cylinder 51 will be fed with compressed air by means of a pair of ducts designated with 52 and 53, respectively, contained inside the cable 3 and connected to the unit 4, which receives the hydraulically powered means, not shown, of the actuator cylinder, according to power and time determined by the control unit 4.

The return of the pressing member 9 inside its own recess 8 is guaranteed thanks to elastic members 54 extended between the pressing member 9 and the respective jaw 6. In the present example said elastic members 54 are a pair of helicoidal springs, placed symmetrically on the sides of the actuation arm 13.

The advantages of the use of a pneumatic actuator cylinder will be stressed with greater details by referring to the third embodiment example.

By referring to FIG. 5 a second variant of said embodiment example of the applicator 1 will be described, for which the same reference numerals designate equal or equivalent components.

In this applicator, the activation means of the fixing elements of the additional hair extensions comprises, apart from the pressing member, also a vibrating member which could be constituted by one of the two jaws 6, 7, in the present embodiment example by the second jaw 7.

Such vibrating member is able to transmit vibrations with substantially ultrasonic frequency which can melt, by intermolecular friction, a thermoplastic substance, such for example a polyester, which constitutes a fixing element.

Said substance, upon stopping the vibration, almost immediately returns to the solid state and implements a connection between extension and head hair.

In the present embodiment example, the second jaw 7, which acts as vibrating member, is connected to vibration-generating means 60 received inside the handle 2 and powered through the cable 3 of the unit 4 which stores the dispensing time period of the vibration, in cooperation with the action of the pressing member 9.

By referring to FIGS. 6 and 7, an additional embodiment example of the applicator according to the invention is described, for which the same reference numerals designate equal or equivalent components.

Compared to the preceding example, the applicator 1 has substantially a fixed jaw, that is a fixed jaw member 7 functionally corresponding to said second jaw 7 of the preceding embodiment example, and a mobile jaw in translation which acts as pressing member 9.

As in the preceding example, the member of fixed jaw 7 is directly connected to a handle 2 and it comprises a contrast plate 10. Unlike the preceding example, the activation means 11, which can be electric or hydraulic and which in the present example is of electric kind, is received inside the handle 2.

The pressing member 9 is apt to move according to a bidirectional translation motion with respect to a guide 61 connected to the handle 2. By means of the guide 61, the pressing member 9 is connected to said actuation means. In the present example, the actuation means comprises an electric motor 14 equipped with a driving shaft 15 which, by means of a fit 62 of gear wheels, actuates rotationally a threaded pin 63 thereto a nut screw 64 is engaged, directly connected to the pressing member.

As in the first embodiment example, thermistor activation means 19 are inserted in the pressing member 9. Or else, the activation means can be of the vibrating kind, connected to the pressing member 9 or to the member with fixed jaw 7.

Also in this case, the motion of the pressing member 9 can be determined pneumatically.

By referring to the FIG. 8, a variant of the applicator 1 just described does not have considerable structural differences but it comprises a handle 2 placed perpendicularly to the fixed jaw member 7, with a L-like shape. The guide 61 is placed at the distal end of the handle 2, inside thereof a nut screw 64 is engaged on a screw shaft 63 the axis thereof, as well as that of the electric motor 14 and of the respective driving shaft 15 thereto it is directly connected, is parallel to the axis according to which the handle 2 develops.

As it will be clear from the following operation description, both said embodiment examples are implemented so that the actuation means 11 is activated by a start command and operates according to a pre-set programme providing a translation of the pressing member 9 towards the fixed jaw member 7, a compression of a portion of head hair and one or more fixing elements of respective additional hair extensions, activation of said fixing elements and down stroke of the pressing member 9.

Figure 9:
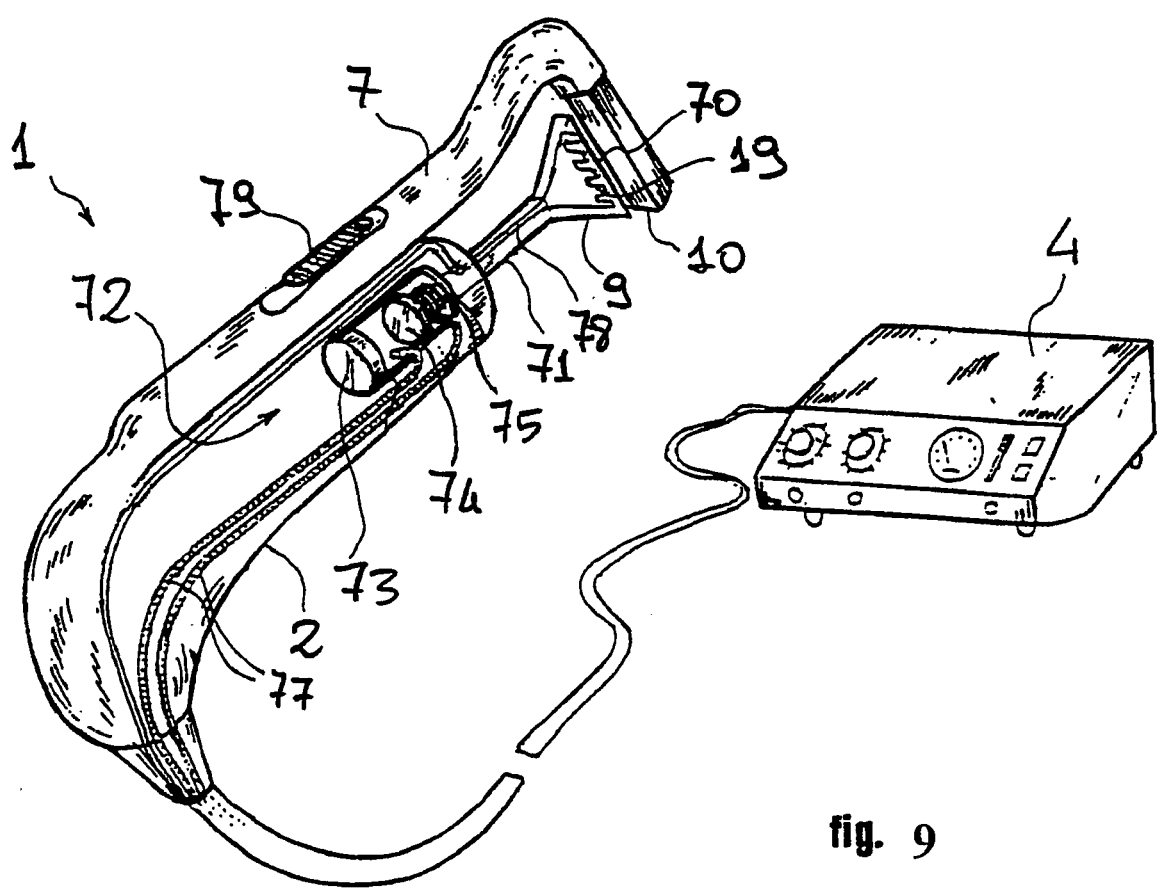
FIG. 9 shows a perspective and partial sectional view of a third embodiment example of an applicator according to the invention.

By referring to FIG. 9 an additional embodiment of an applicator according to the present invention will be now described hereinafter.

In particular, this applicator 1 has a body 2, which acts as handle and receives the inner devices which will be described hereinafter. A contrast fixed member 7, comprising a resting plane 10, is secured to the body 2.

It is to be noted that the resting plane 10 is substantially perpendicular to the development of the handle 2. On the sides of the resting plane 10 tines of comb means can be placed for combing the extensions to be applied, not shown as they are wholly conventional.

The applicator 1 further comprises a mobile pressing member 9 acting on said fixed member 7. It has a pressing plane 70 formed on the end of a stem 71 extending from the body 2, the axis of the stem 71 being coincident with the axis of the development of the handle 2. The pressing plane 70 too is substantially perpendicular to the development of the handle 2.

The mobile pressing member 2 is controlled by a pneumatic device 72 of the above-mentioned actuation means, operating with a predetermined pressure, received in the handle 2 and connected to said stem 71. The pneumatic device 72 comprises a simple-effect piston 73 containing a plunger 74 connected to the stem 71 and a spring 75 guaranteeing the return of the stem 17. The piston 73 is powered by compressed air by a central system 4 through a duct 77. The central system 4 is equipped with a system for adjusting said predetermined pressure.

This description of the actuation means, wherein the predetermined pressure plays an important role, can be obviously adapted also to the applicators according to the first and second embodiment example.

The mobile pressing member 9, at its own pressing plane 70, is heated to activate the adhesion of the fixing elements E, advantageously manufactured with a thermoplastic material. To this purpose, in the mobile pressing member 9 a thermistor 19 is received, electrically powered by the central system 4 through cables 78 with a predetermined voltage upon which the temperature depends. Said central system further comprises a timer which, in reply to a control button 79 placed on the body 11, determines the carrying out of a compression-heating-decompression cycle implementing the connection between extensions C and a head hair T.

Therefore, upon setting the temperature, the pressure and the compression time, the simple actuation of the button 79 determines the carrying out of the above cycle, that is the complete joining of a group of extensions C, as it will be clearer hereinafter.

Also in this case, a vibrating system instead of the above described thermal system can be provided.

By referring to FIG. 16, the applicator 1 can be mounted in a specific apparatus, designated with 130, comprising an extensible and revolving arm 131 thereon a support cable 132 is appended, which supports the applicator 1. The cable is connected to a counter-weight system which virtually annuls, for the operator, the weight of the applicator 1.

Advantageously, the apparatus 130 comprises a basement 133 which supports said central system 4 and that is mounted on wheels 134, so as to arrange the whole in a position facing the armchair receiving the user.

By referring to FIGS. 10, 11 and 12 a thickening assembly, generally designated with 100, generally comprising extensions of hairs, is described.

It comprises an adhesive tape 102 which is preferably but not exclusively substantially transparent, being aimed at being applied on a head hair to be thickened in the thickening method.

The transparency enables then to follow more clearly the application steps and the obtained effect also once the tape 102 has been applied.

The material constituting the adhesive tape 102 is conveniently but not exclusively heat-resistant for the reason which will be described in detail hereinafter. The used adhesive is of the not-permanent and reversible kind, pressure-operating, and it is placed on a single adhesive surface of the tape 102.

The adhesive tape 102 has a first tract 103, which comprises a respective first adhesive surface 143, and a remaining part 104 of adhesive tape 102 which can be folded up on the tract 103 by fully covering it (FIGS. 11 and 12). Advantageously, in the present embodiment example, also said remaining part 104 has a respective second adhesive surface 144. The tract 103 and the remaining part 104 are separated by a simple score or folding line 105.

Still by referring to FIG. 10, a plurality 106 of extensions C is described, comprising a substantially predefined quantity of hairs which could be natural or artificial, with a properly selected and uniform colour or with streaks. Such extensions are also known as extensions, in particular if used in lengthening procedures.

The assembly 100 according the invention can comprise extensions C with different thickness, length and colour. In general they extend from respective proximal ends 107, aimed at being joined to a head hair, to free distal ends 108. In each extension C, the respective hairs have a preferably uniform length.

At said proximal ends 107, each extension C comprises a fixing element E manufactured, according to the present example, with a thermoplastic material, such as polyamide or polyester or also polyurethane, for example nylon.

Each proximal end 107 and each fixing element E is arranged on said first adhesive surface 143 of the tract 103 of adhesive tape 102. The fixing elements E are substantially equidistant and placed in the centre of the tape 104. The extensions C are aligned parallelly one to the other, so that the hairs of adjacent extensions C do not knot ones with the others.

The remaining part 104 of adhesive tape 102 has means for designating the position of the fixing elements which, in the present embodiment, comprise a printed line 149. By folding up the remaining part 104 on the tract 103 said line 149 arranges on the fixing elements E.

On the opposite side with respect to the remaining part 104, the adhesive tape 102 comprises a tongue 145, adhesive too, apt to be joined on the remaining part 104 folded-up on the tract 103, in a substantially wallet-like shape.

In folded-up configuration, the assembly 100 further comprises a pair of recesses 146 obtained on the tape 102 on the side edges, that is on the scores joining the remaining part 104 and the tongue 145 to the tract 103.

Said recesses 146 are positioned at said means for designating the fixing elements E and play the guiding function for the bonding means which will be described hereinafter.

By referring to FIG. 10, the assembly 100 comprises a support tape S too, manufactured with a material easily detachable from the adhesive tape 102, such for example silicone paper, linen paper or plastic, provided to protect the adhesive surfaces 143, 144 and the fixing elements E, so that the adhesive tape 102 is prevented from folding-up, curling-up and sticking.

The adhesive material used on said adhesive surfaces 143, 144 has an adhering force on the tape 102 higher than the one occurring on the material of the fixing element E, so that residues of adhesive material do not remain on the latter at the end of the application.

In this preparation technique, it is assumed that the tape 102 is equipped with the proximal ends 107 of the extensions C already adhered to the adhesive surface 143 of the destination tract 103, but it is also possible a solution wherein the extensions are separately provided with a variety of thicknesses, lengths, colors, etc.

To join the fixing element E to the respective end, several systems can be used, among which hot glueing, injection, etc.

The preferred shape of the fixing element is rectangular, with width and thickness (magnified by the figures) substantially equal to width and thickness of the respective extension 106 to limit at the minimum the quantity of thermoplastic material, which acts as glue, as it will be clear hereinafter.

It is then to be meant that said fixing element E could have different sizes, usually divided into big, for thick extensions with great length and thickness; medium, for extensions with intermediate length and thickness; and small for extensions characterized by the minimum thickness, aimed at thick applications of extensions.

Still in the present example, the thermoplastic material is a substance apt to be melt at a temperature higher than room temperature, by assuming the properties of a plastic fluid and then by cooling up and solidifying at room temperature.

Substances with analogous proprieties can be melt by directly applying mechanical energy, under the form of high-frequency vibrations, ultrasonic vibrations in particular. In this case, the intermolecular vibration and the corresponding rubbing generates the heat quantity necessary to make the molecules plastically slide one with respect to the other. The heat generation stops upon interrupting the vibrations, by determining a substantially immediate solidification.

Examples of substances which can be used as thermoplastic material are polyester, polyamide, polyurethanes and still others.

The function of the fixing element according to the present invention is that of keeping joined the hairs of each extension 106 and also that of providing the attacking point of the extension to the hair of the head hair to be thickened.

Among the additional possible examples of fixing elements there are plastic members, disc-like or seed-pearl-like shaped, thereon the hairs of the extension are fastened. Bonding means are associated to these fixing elements, for examples constituted by portions of thermoplastic substance as already previously described, or glues and/or adhesives of other nature: by pressure, thermosetting, thermo-retractile, etc. Some examples of fixing elements are described in the Italian patent application No. RM2001A000317 of 7 Jun. 2001 in the name of the same Applicant which is here incorporated by way of reference.

Additional decorative members, such as small diamonds and the like, could be added to the fixing element E, which will be provided with a colour compatible with the one of the hairs of extensions 106.

Figure 13:
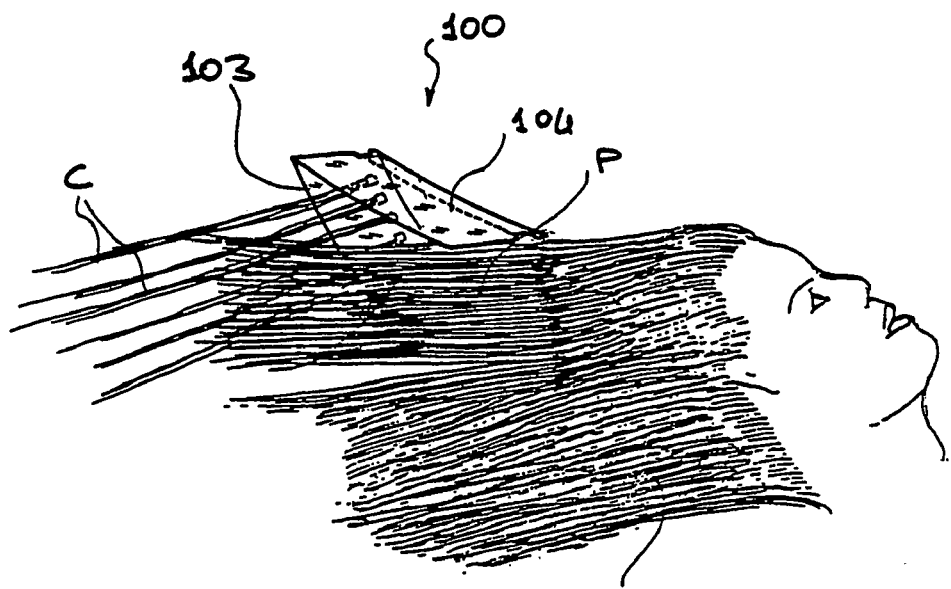
FIGS. 13, 14 and 15 show perspective views illustrating the application of said set of extensions by means of one of the applicators of the preceding figures.
Figure 14:
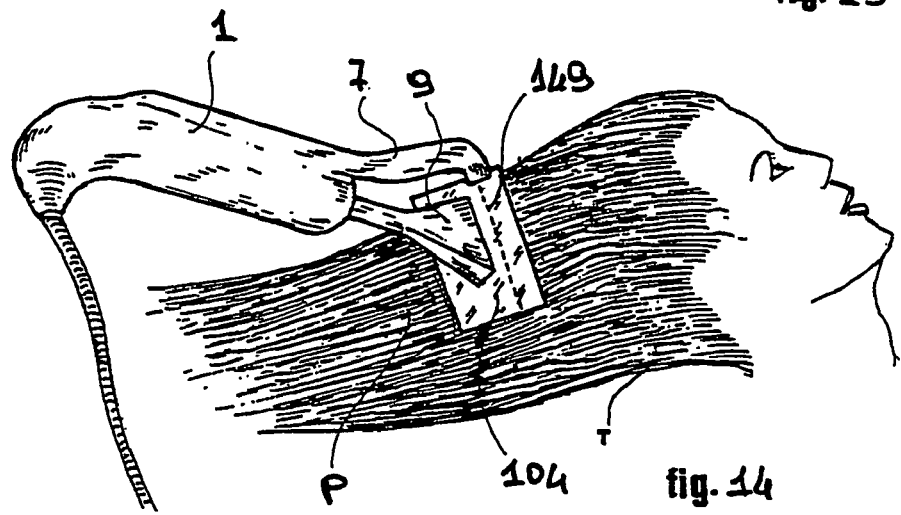
Figure 15:
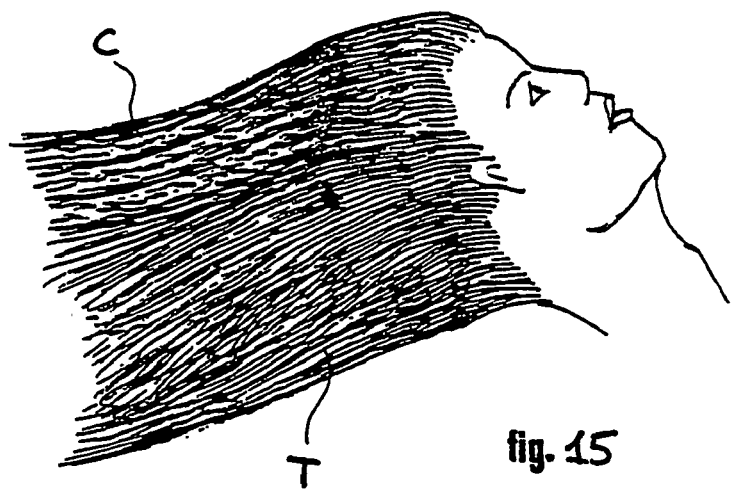

All the fixing elements and the above-described variants thereof are adapted for the application with the applicator according to the invention. Such application will be described by referring to FIGS. 13, 14 and 15. In particular, the applicators according to the above-mentioned three embodiment examples are adaptable to the above-described assembly of extensions as well as to any assembly of extensions, in particular to those wherein the fixing elements are supported on a tape portion for the simultaneous handling of all the extensions of the assembly.

According to what above described, a plurality of extensions C is provided, having the respective proximal ends 107 equipped with a respective fixing element E adhered, as specified, on the adhesive surface 143 of the tract 103 of said adhesive tape 102 so that the remaining part 104 of the adhesive tape 102 can be folded-up on said tract 103.

The application provides a step wherein a portion P of head hair to be thickened T is prepared by means of a hair-dressing, to align all hairs parallelly one to the other.

Subsequently, said application comprises an additional step wherein a portion of head hair to be thickened T is encompassed between said tract 103 and said remaining part 104 of folded-up adhesive tape 102, by detecting an area aimed at receiving said proximal ends 107.

Conveniently, the tape's remaining part is adhered outside the head hair, that is with the adhesive surface 144 thereof facing the head and the outer not adhesive face.

Therefore, the tract 103 is adhered under said portion of head hair, with the respective adhesive surface 143 arranging the fixing elements E of the extensions below the portion of head hair, and therefore hidden.

The adhesion of the tract 103 can precede the adhesion of the remaining part, and in this step it is necessary to keep aligned the hairs of the portion P by means of hair-dressing.

In this way, the assembly 100 is closed-up with a wallet-like shape. In this step it is noted that the upper edge of the adhesive tape 102, next to the fixing elements and not crossed by the extensions C, can be rested to the scalp, then by uniformly spacing the fixing elements E themselves from the scalp itself.

Furthermore, the portion of adhesive tape 102 crossed by the extensions C winds the portion of head hair to be thickened T by keeping it in a fixed position and still, having the direction given by said hair-dressing.

Thanks to the adhesion of the tongue 145 the perfect overlapping of the tract 103 and of the remaining part 4 is guaranteed. The fixing elements 109 remain hidden by the portion P of head hair but their position can be detected thanks to the printed line 149.

Subsequently, the fixed member 7 of the applicator 1 is rested by taking the recesses 146 as reference. The mobile member 9 can be easily addressed towards the remaining part 104 by taking said printed line 149 as reference. In this step, bonding means, essentially constituted by said tape 101 and by the fixing elements E, are activated by the operator.

In the present embodiment example, the melting propriety of the thermoplastic material is exploited. In fact, the administration of energy to the fixing elements E through the adhesive tape 101 is provided. By referring to FIG. 14, the pliers applicator 1 is then used wherein the fixed member 7 and the mobile member 9 have an elongated shape and can tighten the whole tape 102 in length, by distributing a substantially equal pressure, and by tightening then the fixing element E.

In this context, an alternative system can also be used to transmit energy to the fixing element E, which provides the use of mechanical energy under the form of vibrations with ultrasonic frequency, for example in the range from 20 to 60 kHz. In this case, one or both the pressing members will be connected to a vibrating member as above described, for example a piezoelectric member exposed to an alternating current of the desired frequency, and they will transmit the vibration to the fixing element E, both directly and through the tape 101.

In this case, it is to be noted that the administration of vibrations allow the molecules of the fixing element E in thermoplastic material to easily slide between the single hairs of the extension 6 and of the head hair T, by penetrating them and mixing them one to the other.

By turning back to the present example, through the button 79, the applicator 1 is actuated and a constant pressure, set free from the thickness of what has been received between the members 7, 9 operating as pliers, is applied for a time interval with a predetermined length, in a uniform way along the remaining part 104, that is in a equal way on each fixing element 9 which transforms into connection on the head hair.

It is meant that this application, according to the same modes, could be repeated an infinite number of times, always with the same results and without the operator be obliged to apply any muscular strength.

Conveniently, it is possible to apply several adhesive tapes 102 and then activate said fixing elements in rapid sequence. In a slightly different configuration, the tape can be firstly secured to the fixed member or to the mobile member of the applicator which is also used to position the tape, and then the fixing elements of the extensions, directly on the head hair. In this case, the fixed and/or mobile members will be equipped with means to adhere the extensions on a respective plane thereof.

In this step it is stressed how said applicator is actuated and a constant pressure, set free from the thickness of what has been received between the members operating as pliers, is applied for a time interval with a predetermined length, in a uniform way along the tape 104, that is in an equal way on each fixing element E which transforms into connection. In this way, the compression will stop automatically upon reaching said predeterming pressure in the pneumatic actuation, in a completely independent way from the thickness of hair and of the compressed fixing elements. In this way, greater thicknesses will not undergo an excessive squeezing and a correct pressure will be applied on reduced thicknesses.

It is to be meant that operating parameters such as: amount of the applied pressure, pressure duration, heating amount (temperature), heating duration, vibrations' frequency, vibrations' intensity, vibrations' duration, could be pre-set and stored in the control unit and they could be varied based upon the specification of the extensions and the fixing elements to be applied.

Once finished this joining step, it is sufficient, at the end of cooling, to remove the adhesive tape 102 without leaving glue on hair (FIG. 15), to complete the work.

It is clearly to be meant that what above described can be adapted to any of the above-described applicators, all belonging to the same inventive concept.

It is to be meant that the applicator in the above-describe example, in case, can comprise more than one pressing member, shaped with a specific configuration to satisfy particular application requirements.

In conclusion, it is noted that in the above-described examples a light structure is used, of the fork-like kind, with two fixed jaws and without mobile parts directly controlled by the operator, maximum guarantee of repeating the application.

The pressure is uniformly applied on the length of the pressing member which, for applications of extensions in series, could have exemplary sizes of 7 cm in length and 2 cm in width.

The uniformity is also guaranteed by the presence of the actuation arm pivoted to the pressing member.

Such applicator allows then the substantial elimination of the human factor and of the errors coming therefrom, by placing at disposal a device which can be actuated without particular technical knowledge and which does not afflict the operator with an effort excessive in the long run.

The application times are reduced to the minimum and the flexibility in use is increased as well, by making simpler the users' access to lengthening, thickening but also to temporary highlights and the like.

To the above described applicator a person skilled in the art, in order to satisfy additional and contingent needs, can introduce several additional modifications and variants, all however within the protective scope of the present invention, as defined by the enclosed claims.

The invention claimed is:

1. A hair extension applicator, of the kind used to lengthen and/or thicken head hairs by applying hair extensions to natural hair, comprising:
    a handle;
    a fixed member and at least a mobile pressing member, the fixed member and mobile pressing member in opposition to each other and apt to receive therebetween a portion of head hair and one or more fixing elements of respective hair extensions, said fixed member being a rest for the fixing elements of the respective hair extensions, wherein the mobile pressing member is apt to move according to a bidirectional translational motion with respect to a guide for the pressing member, the guide being connected to the handle so that the bidirectional translational motion of the mobile pressing member is with respect to the handle; and
    an actuation means of said mobile pressing member, said actuation means apt to control the bidirectional translational motion of the mobile pressing member;
    wherein the bidirectional translational motion of the mobile pressing member comprises the mobile pressing member moving toward and away from the fixed member;
    wherein the mobile pressing member applies a pressure onto said fixed member in response to the mobile pressing member moving toward the fixed member; and
    wherein the bidirectional translational motion of the mobile pressing member is controlled by a pneumatic device of said actuation means, the pneumatic device operating at a predetermined pressure.

2. The applicator according to claim 1, wherein the actuation means comprises an actuation arm which is pivoted on the pressing member, to compensate for possible differences in thickness of the head hair.

3. The applicator according to claim 2, wherein the actuation means comprises an electric motor having a drive shaft, said actuation arm being mechanically engaged to said drive shaft to generate a translation motion.

4. The applicator according to claim 2, wherein the actuation arm is inserted in a slideway that limits a stroke of the actuation arm.

5. The applicator according to claim 1, wherein said fixed member comprises a resting plane.

6. The applicator according to claim 5, wherein sides of the resting plane are equipped with a comb structure to align the receiving hair.

7. The applicator according to claim 5, wherein the mobile pressing member has a pressing plane formed on the end of a stem.

8. The applicator according to claim 7, wherein said actuation means is located within a portion of the handle, wherein the resting plane and the pressing plane are substantially perpendicular to the portion of the handle in which the actuation means is located, an axis of the stem being coincident with an axis of the portion of the handle in which the actuation means is located.

9. The applicator according to claim 1, wherein said actuation means is located within the handle.

10. The applicator according to claim 1, wherein the pneumatic device comprises a simple-effect piston containing a plunger and a spring guaranteeing a return of the plunger, the piston being powered by a central system through a duct, the central system being equipped with a system for adjusting said predetermined pressure.

11. The applicator according to claim 1, wherein the mobile pressing member has a pressing plane is heated at the pressing plane to activate the adhesion of fixing elements.

12. The applicator according to claim 11, wherein in the mobile pressing member has a thermistor located therein, the thermistor electrically powered by a central system at a predetermined voltage upon which a temperature of the thermistor depends.

13. The applicator according to claim 1, wherein a control unit comprises a timer which, in response to a command button, determines an execution of a compression—heating—decompression cycle that implements a connection between the extensions and the head hair.

14. The applicator according to claim 1, which is assembled in a specific apparatus comprising an extensible and revolving arm from which a supporting cable is appended, the cable supporting the applicator, said supporting cable being connected to a counter-weight system which virtually annuls the applicator weight for the operator.

15. The applicator according to claim 14, wherein a control unit comprises a timer which, in response to a command button, determines an execution of a compression—heating—decompression cycle that implements a connection between the extensions and the head hair, and wherein said apparatus comprises a base supporting said control unit, wherein the base is assembled on wheels.

16. The applicator according to claim 1, wherein, in opposition to said pressing member, the fixed member has a surface plate manufactured with elastically deformable material.

17. The applicator according to claim 1, wherein the pressing member is movably disposed within a recess of a jaw and moves out of the jaw as the pressing member moves toward the fixed member, wherein elastic members extended between the pressing member and the jaw act to return the pressing member into the recess.

18. The applicator according to claim 1, having activation means for the fixing elements of the hair extensions, comprising: the pressing member and a vibrating member able to transmit vibrations with substantially ultrasonic frequency which can melt, by intermolecular friction, a thermoplastic substance constituting a fixing element.

19. The applicator according to claim 18, wherein said fixed element operates as the vibrating member and is connected to a vibration-generating means received inside the handle.

* * * * *